United States Patent
Goyal et al.

(10) Patent No.: US 12,158,394 B2
(45) Date of Patent: Dec. 3, 2024

(54) DETECTING FLUID LEAKAGE AT AIRCRAFT HATCH

(71) Applicant: Rohr, Inc., Chula Vista, CA (US)

(72) Inventors: Nitin Kumar Goyal, Bangalore (IN); Robin Jacob, Bangalore (IN)

(73) Assignee: Rohr, Inc., Chula Vista, CA (US)

( * ) Notice: Subject to any disclaimer, the term of this patent is extended or adjusted under 35 U.S.C. 154(b) by 49 days.

(21) Appl. No.: 17/980,701

(22) Filed: Nov. 4, 2022

(65) Prior Publication Data

US 2023/0145226 A1 May 11, 2023

(30) Foreign Application Priority Data

Nov. 11, 2021 (IN) .............................. 202111051811

(51) Int. Cl.
   *G01M 3/04* (2006.01)
   *G01K 11/3206* (2021.01)
   *G01K 13/00* (2021.01)
   *G01L 1/24* (2006.01)
   *H04B 10/40* (2013.01)

(52) U.S. Cl.
   CPC ........... *G01M 3/04* (2013.01); *G01K 11/3206* (2013.01); *G01K 13/00* (2013.01); *G01L 1/246* (2013.01); *H04B 10/40* (2013.01)

(58) Field of Classification Search
   CPC ..... G01M 3/04; G01K 11/3206; G01K 13/00; G01L 1/246; H04B 10/40
   See application file for complete search history.

(56) References Cited

U.S. PATENT DOCUMENTS

| | | |
|---|---|---|
| 6,986,287 B1 | 1/2006 | Dorfman |
| 8,172,180 B2 | 5/2012 | Press |
| 10,260,964 B2 | 4/2019 | Fisk |
| 2010/0021174 A1 | 1/2010 | Truong |
| 2017/0336268 A1 | 11/2017 | Wilson |
| 2019/0353552 A1* | 11/2019 | Doyle .................. G01M 11/085 |
| 2020/0003651 A1 | 1/2020 | Berkey |
| 2020/0239162 A1 | 7/2020 | Saito |

OTHER PUBLICATIONS

EP search report for EP22207043.5 dated Apr. 3, 2023.

* cited by examiner

*Primary Examiner* — Kevin K Pyo
(74) *Attorney, Agent, or Firm* — Getz Balich LLC (57) ABSTRACT

An assembly is provided for an aircraft. This aircraft assembly includes a fuselage and a second system. The fuselage includes a wall and a hatch configured to close an opening in the wall. The sensor system includes an optical fiber, a transmitter and a receiver. The optical fiber is arranged at an interface between the hatch and the wall. The transmitter is configured to transmit first electromagnetic radiation into the optical fiber. The receiver is configured to detect second electromagnetic radiation received from the optical fiber to provide receiver data. The sensor system is configured to detect fluid leakage across the interface between the hatch and the wall based on the receiver data.

19 Claims, 8 Drawing Sheets

DETECTING FLUID LEAKAGE AT AIRCRAFT HATCH

This application claims priority to Indian Patent Appln. No. 202111051811 filed Nov. 11, 2021, which is hereby incorporated herein by reference in its entirety.

BACKGROUND

1. Technical Field

This disclosure relates generally to an aircraft and, more particularly, to an interface between a hatch and a wall of an aircraft fuselage.

2. Background Information

An airplane fuselage includes a fuselage wall and a door for opening and closing an opening in the fuselage wall. A rubber seal element is included to provide a sealed interface between the door and the fuselage wall. Degradation of this seal element may lead to gas leakage (e.g., atmospheric pressure leakage) across the sealed interface and out of the airplane fuselage. However, it may be difficult to detect such gas leakage until the leak is relatively large using existing airplane decompression detection systems. There is a need in the art therefore for systems and methods for detecting a fluid leak/an unexpected change in pressure at, inter alia, an airplane door.

SUMMARY OF THE DISCLOSURE

According to an aspect of the present disclosure, an assembly is provided for an aircraft. This aircraft assembly includes a fuselage and a second system. The fuselage includes a wall and a hatch configured to close an opening in the wall. The sensor system includes an optical fiber, a transmitter and a receiver. The optical fiber is arranged at an interface between the hatch and the wall. The transmitter is configured to transmit first electromagnetic radiation into the optical fiber. The receiver is configured to detect second electromagnetic radiation received from the optical fiber to provide receiver data. The sensor system is configured to detect fluid leakage across the interface between the hatch and the wall based on the receiver data.

According to another aspect of the present disclosure, another assembly is provided for an aircraft. This aircraft assembly includes a fuselage and a sensor system. The fuselage includes a wall and a hatch configured to close an opening in the wall. The sensor system includes an optical fiber, a transmitter and a receiver. The optical fiber is arranged at an interface between the hatch and the wall. The transmitter is configured to transmit first electromagnetic radiation into the optical fiber. The receiver is configured to detect second electromagnetic radiation received from the optical fiber to provide receiver data. The sensor system is configured to determine temperature data at the interface between the hatch and the wall based on the receiver data.

According to still another aspect of the present disclosure, a method is provided involving an aircraft fuselage including a wall and a hatch. During this method, first electromagnetic radiation is transmitted into an optical fiber. The optical fiber is arranged at an interface between the hatch and the wall. The hatch is configured to close an opening in the wall. Actual second electromagnetic radiation received from the optical fiber is detected. A fluid leak across the interface between the hatch and the wall is detected based on a wavelength shift between the actual second electromagnetic radiation and expected second electromagnetic radiation.

The sensor system may also be configured to process the temperature data to detect fluid leakage across the interface between the hatch and the wall.

The sensor system may also be configured to process the receiver data to determine a difference between the second electromagnetic radiation and expected electromagnetic radiation. The sensor system may still also be configured to detect the fluid leakage based on the difference between the second electromagnetic radiation and the expected electromagnetic radiation.

The difference between the second electromagnetic radiation and the expected electromagnetic radiation may be or include a wavelength shift between the second electromagnetic radiation and the expected electromagnetic radiation.

The sensor system may also be configured to determine a flowrate of the fluid leakage across the interface between the hatch and the wall based on the receiver data.

The sensor system may also be configured to provide an indicator signal when the flowrate of the fluid leakage across the interface is greater than a threshold.

The sensor system may also be configured to determine a location of the fluid leakage across the interface.

The optical fiber may include a grating configured to shift a wavelength of the first electromagnetic radiation.

The first electromagnetic radiation may interact with and pass through the grating to at least partially provide the second electromagnetic radiation.

The second electromagnetic radiation may include a reflection of at least a portion of the first electromagnetic radiation by the grating.

The optical fiber may include a plurality of gratings arranged at discrete locations along the interface between the hatch and the wall. The gratings may include a first grating and a second grating. The first grating may be configured to reflect a first wavelength of electromagnetic radiation. The second grating may be configured to reflect a second wavelength of electromagnetic radiation.

The optical fiber may include a plurality of gratings arranged at discrete locations along the interface between the hatch and the wall. Each of the gratings may be associated with unique electromagnetic radiation transmitted into the optical fiber.

The optical fiber may extend longitudinally between a first end and a second end. The transmitter and the receiver may be arranged at the first end.

The optical fiber may extend longitudinally between a first end and a second end. The transmitter may be arranged at the first end. The receiver may be arranged at the second end.

The aircraft assembly may also include a seal element arranged at the interface between the hatch and the wall. The optical fiber may be disposed along and outside of the seal element.

The aircraft assembly may also include a seal element arranged at the interface between the hatch and the wall. At least a portion of the optical fiber may be disposed within the seal element.

The optical fiber may be disposed at an exterior side of the interface between the hatch and the wall.

The optical fiber may be disposed at an interior side of the interface between the hatch and the wall.

The aircraft assembly may also include a second sensor system including a second optical fiber, a second transmitter and a second receiver. The second optical fiber may be arranged at the interface between the hatch and the wall. The second transmitter may be configured to transmit third electromagnetic radiation into the second optical fiber. The second receiver may be configured to detect fourth electromagnetic radiation received from the second optical fiber to provide second receiver data. The second sensor system may be configured to detect fluid leakage across the interface between the hatch and the wall based on the second receiver data.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
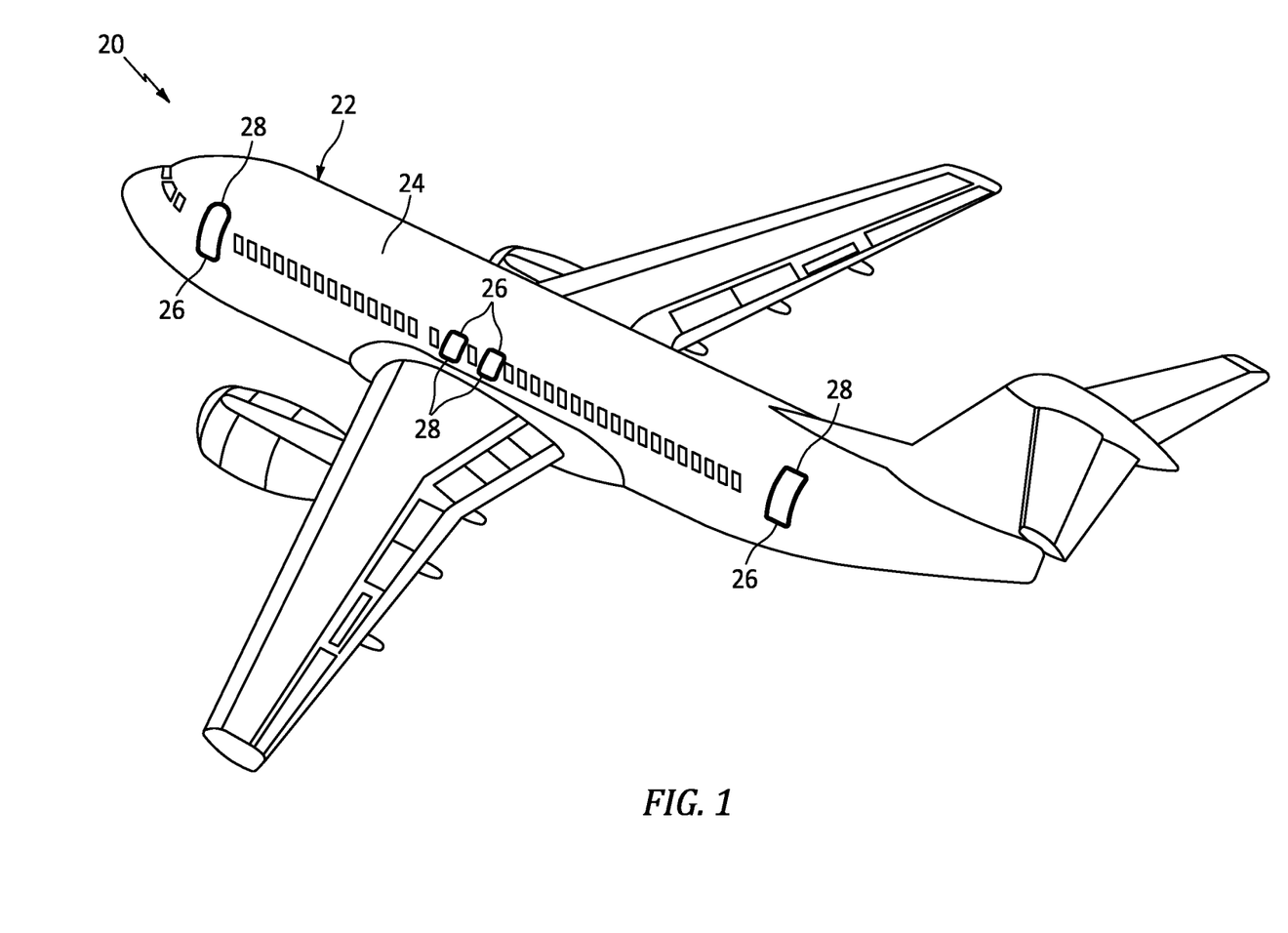
FIG. 1 is a perspective illustration of an aircraft.

FIG. 1 is an illustration of an aircraft 20. This aircraft 20 may be configured as an airplane such as, but not limited to, a passenger plane or a cargo plane. The aircraft 20 of FIG. 1 includes an aircraft fuselage 22. This aircraft fuselage 22 includes a fuselage wall 24 and one or more fuselage hatches 26; e.g., doors, removable panels, etc. Each hatch 26 is configured to open and close a respective opening 28 in the wall 24.

Figure 2:
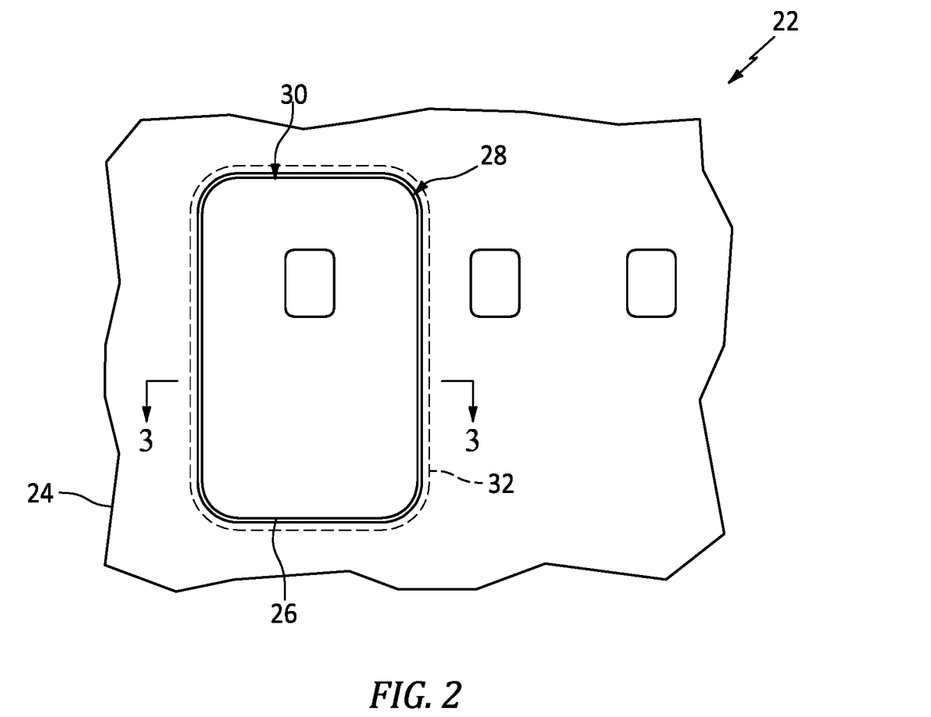
FIG. 2 is a side illustration of a portion of an aircraft fuselage.
Figure 3:
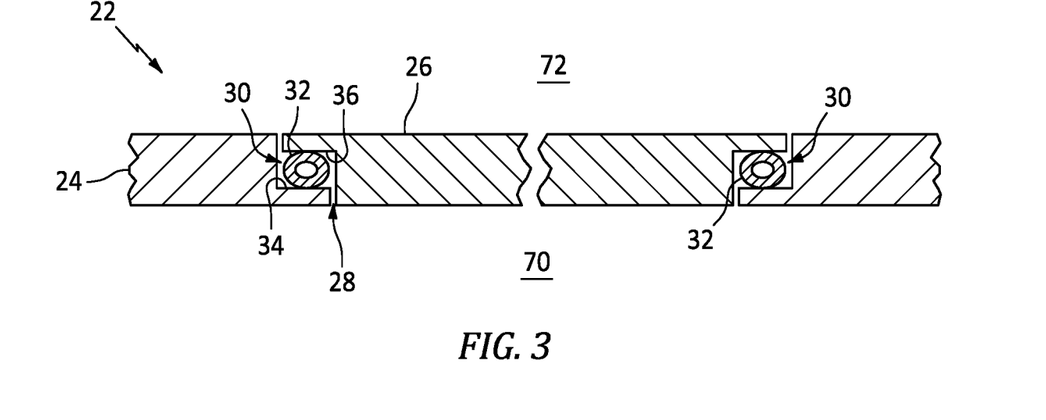
FIG. 3 is a sectional illustration of a portion of the aircraft fuselage taken along line 3-3 in FIG. 2.

Referring to FIGS. 2 and 3, in a closed position, each hatch 26 engages the wall 24 at a hatch-wall interface 30 between the respective hatch 26 and the wall 24. The hatch-wall interface 30 of FIG. 3 is configured as a sealed interface with a polymer hatch seal element 32 (e.g., a rubber seal element) arranged between and engaging (e.g., contacting, pressed against) a surface 34 of the wall 24 and a surface 36 of the respective hatch 26. The seal element 32 is located at the hatch-wall interface 30. The seal element 32 of FIG. 2 extends longitudinally along the hatch-wall interface 30 and about (e.g., completely around) the respective wall opening 28. The seal element 32 of FIGS. 2 and 3 may thereby seal a gap between the wall 24 and the respective hatch 26 at the hatch-wall interface 30.

Figure 4:
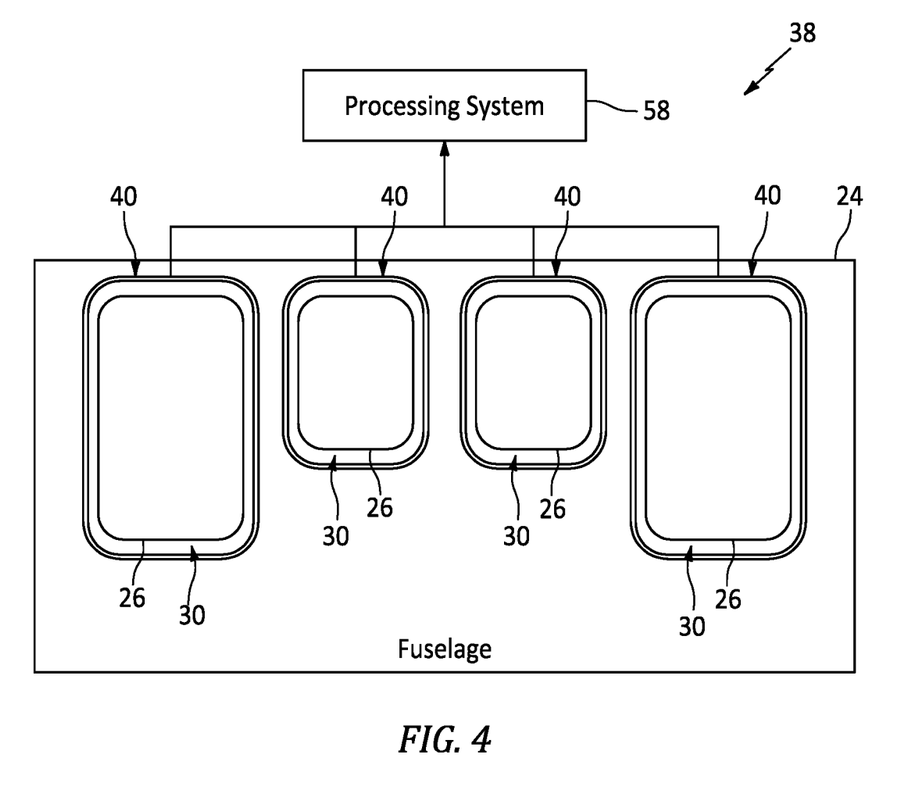
FIG. 4 is a schematic illustration of an assembly for the aircraft.

FIG. 4 schematically illustrates an assembly 38 for the aircraft 20. This aircraft assembly 38 includes the wall 24, one or more of the hatches 26 and one or more sensor systems 40. Each of the sensor systems 40 is configured to monitor the hatch-wall interface 30 between the wall 24 and a respective one of the hatches 26. More particularly, each sensor system 40 is configured to detect fluid leakage (e.g., airflow) across the hatch-wall interface 30 between the wall 24 and the respective hatch 26.

Figure 5:
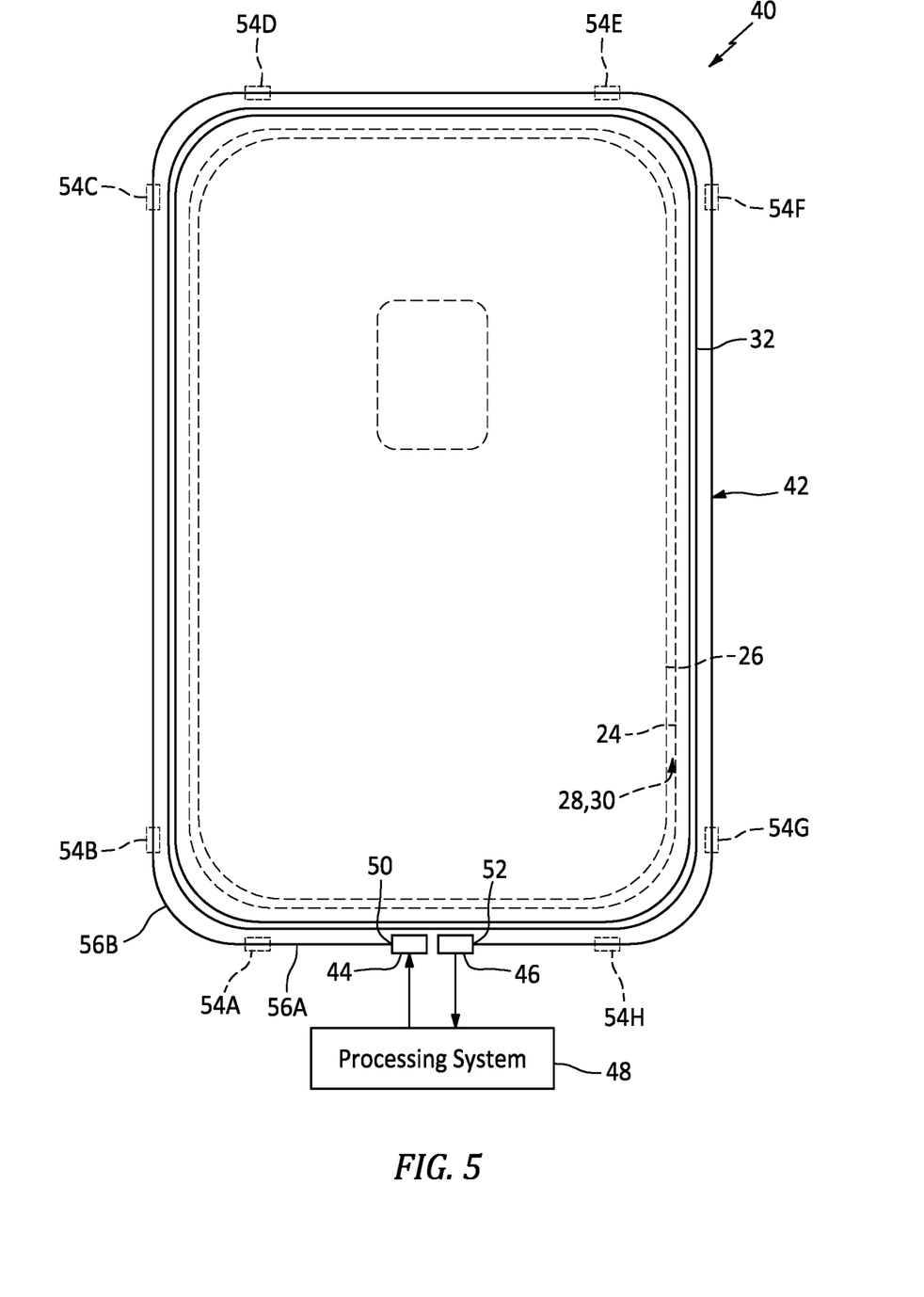
FIG. 5 is a schematic illustration of a sensor system configured at an interface between a hatch and a wall of the aircraft fuselage.

Referring to FIG. 5, each sensor system 40 includes an optical fiber 42 (e.g., a strand of fiber optics), an electromagnetic radiation transmitter 44 and an electromagnetic radiation receiver 46. Each sensor system 40 also includes a processing system 48.

The optical fiber 42 is arranged at (e.g., on, adjacent or proximate) the hatch-wall interface 30 with the seal element 32. The optical fiber 42 extends along a longitudinal centerline between a first end 50 of the optical fiber 42 and a second end 52 of the optical fiber 42.

The optical fiber 42 of FIG. 5 is configured with one or more internal gratings 54A-H (generally referred to as "54"; schematically shown) (e.g., fiber Bragg gratings (FBG)) within a fiber core of the optical fiber 42. These gratings 54 are arranged (e.g., distributed) at discrete locations along the longitudinal centerline between the fiber first end 50 and the fiber second end 52. Each of the gratings 54 is configured to reflect one or more specific wavelengths of electromagnetic radiation (e.g., light) while permitting the remaining wavelengths of the electromagnetic radiation to pass/travel therethrough. Each grating 54 may thereby filter the one or more specific wavelengths of electromagnetic radiation. Each of the gratings 54 may be provided by forming a periodic variation in a refractive index of the fiber core of the optical fiber 42; e.g., by constructing a distributed Bragg reflector within a short segment of the optical fiber 42.

Each of the gratings 54 within the optical fiber 42 is tuned for (e.g., configured to reflect/filter) a different wavelength (or wavelengths) of the electromagnetic radiation. The first grating 54A, for example, may be tuned for a first wavelength of the electromagnetic radiation. The second grating 54B may be tuned for a second wavelength of the electromagnetic radiation which is different than the first wavelength of the electromagnetic radiation. The second wavelength of the electromagnetic radiation may also be separated (e.g., spaced) from the first wavelength of the electromagnetic radiation by one or more intermediate wavelengths of the electromagnetic radiation to provide further differentiation between the different wavelengths of the electromagnetic radiation.

The transmitter 44 is configured transmit one or more wavelengths (e.g., a spectrum) of the electromagnetic radiation into the optical fiber 42. The transmitter 44, for example, may be configured as an electromagnetic radiation emitting device. The transmitter 44 of FIG. 5 is disposed at and/or otherwise in communication (e.g., optically coupled) with the fiber first end 50.

Figure 6:
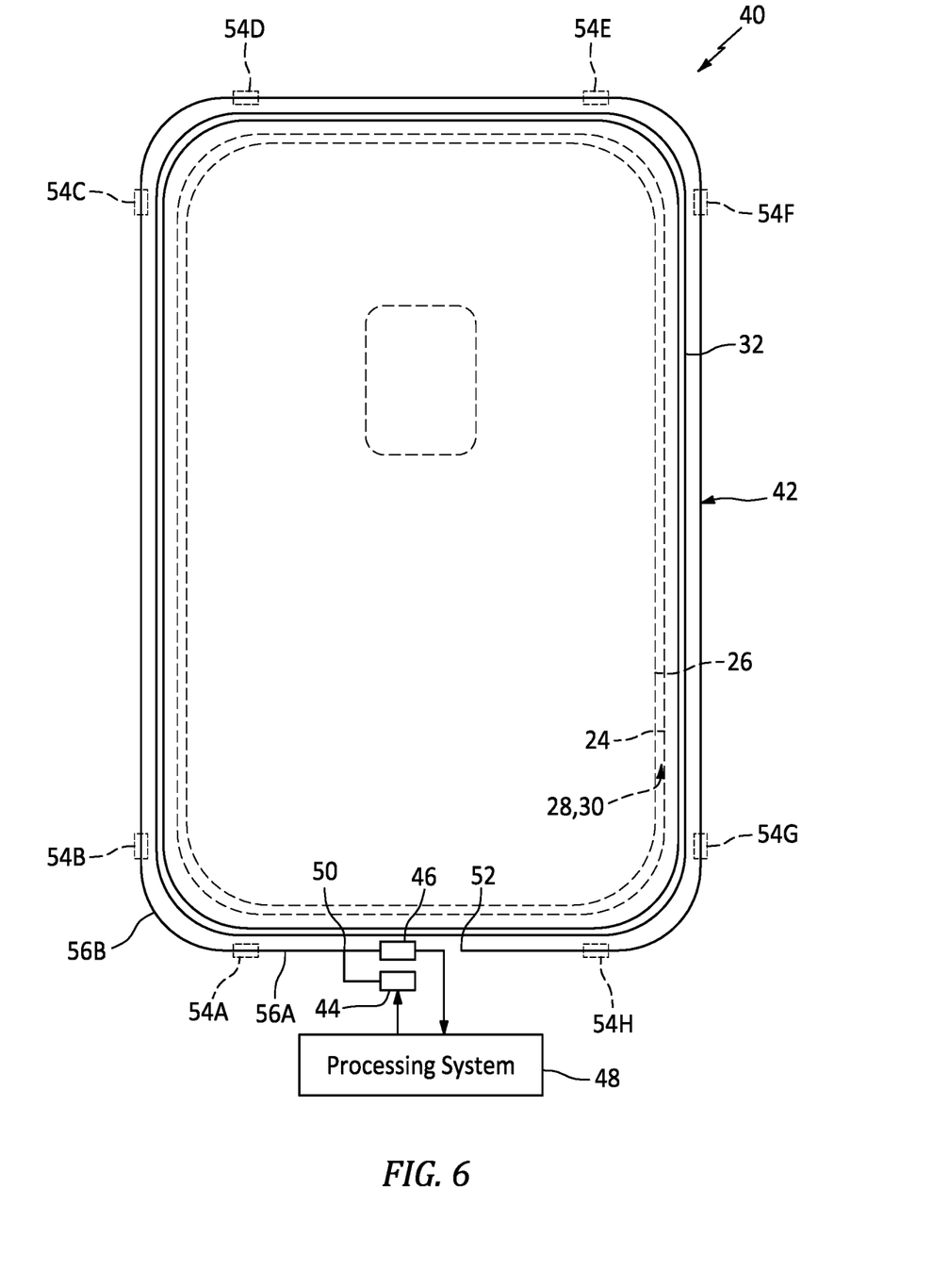
FIG. 6 is a schematic illustration of another sensor system configured at the interface between the hatch and the wall of the aircraft fuselage.

The receiver 46 is configured to receive radiation (e.g., optical) information via electromagnetic radiation received from the optical fiber 42. The receiver 46 is also configured to provide receiver data generated from and/or indicative of the radiation information. The receiver 46, for example, may be configured as an optical receptor or any other electromagnetic radiation receptor/sensor. The receiver 46 of FIG. 5 is disposed at and/or otherwise in communication (e.g., optically coupled) with the fiber second end 52. However in other embodiments, referring to FIG. 6, the receiver 46 may alternatively be disposed at and/or otherwise in communication with the fiber first end 50.

Referring again to FIG. 5, the processing system 48 is in signal communication with the transmitter 44 and the receiver 46. The processing system 48, for example, may be hardwired and/or wirelessly coupled with the transmitter 44 and the receiver 46.

The processing system 48 may be implemented with a combination of hardware and software. The hardware may include a memory and at least one processing device, which processing device may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations such as those described in the method below. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 7:
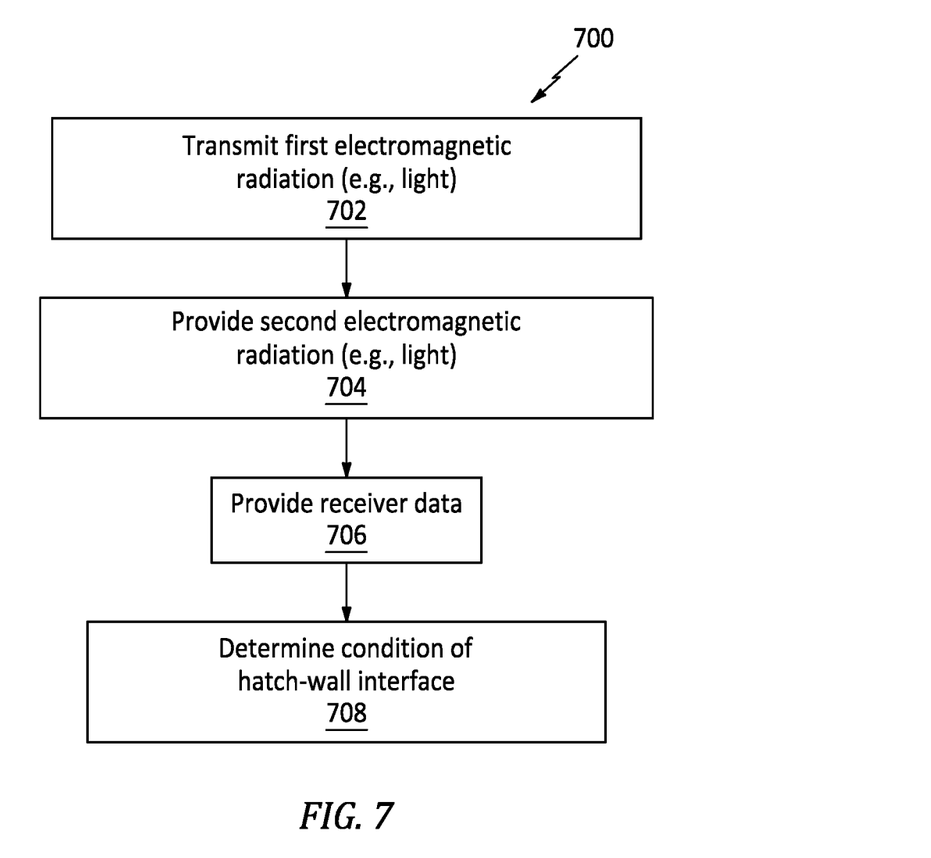
FIG. 7 is a flow diagram of a method involving an aircraft.

FIG. 7 is a flow diagram of a method 700 involving an aircraft such as the aircraft 20 described above. This method 700 is described below for detecting fluid (e.g., air) leakage across a select one of the hatch-wall interfaces 30 (see FIG. 5) during aircraft flight. However, the method 700 may alternatively be performed for detecting fluid leakage across more than one (e.g., all) of the hatch-wall interfaces 30. Furthermore, while the method 700 is described as being performed during aircraft flight, the present disclosure is not limited thereto.

In step 702, first electromagnetic radiation (e.g., a first spectrum of light) is transmitted into the optical fiber 42. The processing system 48, for example, may signal the transmitter 44 to emit the first electromagnetic radiation, which enters the optical fiber 42 at the fiber first end 50.

In step 704, the first electromagnetic radiation travels within the optical fiber 42 and interacts with the one or more gratings 54 to provide second electromagnetic radiation (e.g., a second spectrum of light). The first electromagnetic radiation input by the transmitter 44, for example, travels through a first segment (e.g., 56A) of the optical fiber 42 to the first grating 54A. The first electromagnetic radiation interacts with the first grating 54A, where at least one wavelength of the first electromagnetic radiation is reflected and the remaining wavelengths of the first electromagnetic radiation pass through the first grating 54A to provide first filtered electromagnetic radiation. This first filtered electromagnetic radiation travels through a second segment (e.g., 56B) of the optical fiber 42 from the first grating 54A to the second grating 54B. The first filtered electromagnetic radiation interacts with the second grating 54B, where at least one wavelength of the first filtered electromagnetic radiation is reflected and the remaining wavelengths of the first filtered electromagnetic radiation passes through the second grating 54B to provide second filtered electromagnetic radiation. This electromagnetic radiation propagation and filtering process is repeated along the optical fiber 42 with each grating 54 (e.g., 54C-H) until the second electromagnetic radiation is provided following interaction (e.g., filtering) with the last grating 54; e.g., the eighth grating 54H in FIG. 5. Thus, the second electromagnetic radiation at the fiber second end 52 is different than (e.g., a derivation of) the first electromagnetic radiation at the fiber first end 50.

In step 706, receiver data (e.g., sensor data) is provided. The receiver 46, for example, detects, captures and/or otherwise receives at least a portion or all of the second electromagnetic radiation at the fiber second end 52. The receiver 46 may convert the received second electromagnetic radiation into the receiver data, which receiver data is indicative of the received second electromagnetic radiation.

In step 708, at least one condition of the hatch-wall interface 30 is determined. The processing system 48, for example, receives the receiver data from the receiver 46. The processing system 48 may process this receiver data to determined whether or not there is fluid leakage across the hatch-wall interface 30. The actual receiver data provided by the receiver 46, for example, may be compared to (e.g., predetermined or modeled) expected receiver data, which expected receiver data is data that is expected to be received by the receiver 46 based on one or more parameters such as, but not limited to, a fully sealed hatch-wall interface 30, current flight conditions and/or current aircraft cabin conditions. The actual receiver data may be different than the expected receiver data where, for example, a fluid leak (e.g., air pressure leakage) forms across the hatch-wall interface 30. Such a fluid leak (e.g., air pressure leakage) may cause a local drop in fluid (e.g., air) temperature at the location of the fluid leak, which drop in temperature may alter the (e.g., reflection, filtering) characteristics of one or more nearby gratings 54. For example, the drop in temperature may cause a nearby grating 54 to physically contract. This change in the grating characteristics may result in provision of altered filtered electromagnetic radiation received (e.g., detected) by the receiver 46 such that, for example, there is one or more wavelength shifts/differences between the actual receiver data and the expected receiver data. The magnitude of the wavelength shift(s) are indicative of a temperature at the grating(s) 54, and may be used to predict a flowrate of the fluid leaking across the hatch-wall interface 30 based on the temperature.

Where the actual receiver data is the same as the expected receiver data, the processing system 48 may determine that the condition of the hatch-wall interface 30 is fully operational and serviceable. In some embodiments, slight fluid leakage across the hatch-wall interface 30 may be expected, acceptable and/or accommodatable by an aircraft cabin pressurization system. In such embodiments, the processing system 48 may also determine that the condition of the hatch-wall interface 30 is fully operational and serviceable where the magnitude of the wavelength shift(s)/difference between the actual receiver data and the expected receiver data is less than a first threshold. Where the magnitude of the wavelength shift(s)/difference between the actual receiver data and the expected receiver data is equal to or greater than the first threshold, but less than a second threshold, the processing system 48 may determine that the hatch-wall interface 30 is still serviceable, but no longer fully operational. With such a determination, the processing system 48 may provide a maintenance notification signal (e.g., an alert) such that future maintenance may be planned and performed. Thus, the aircraft 20 may finish its current flight (and possibly one or more additional flights) since the fluid leakage is caught/detected at an early stage. Where the magnitude of the wavelength shift(s)/difference between the actual receiver data and the expected receiver data is equal to or greater than the second threshold, the processing system 48 may determine that the condition of the hatch-wall interface 30 is no longer serviceable. With such a determination, the processing system 48 may provide a notification signal (e.g., an alert) such that (e.g., immediate or otherwise timely) action may be taken. For example, the aircraft 20 may be diverted to a closer airport or maintenance may be performed at the destination airport; but, deployment of oxygen masks may be averted.

The processing system 48 may also determine a predicted location of the fluid leak when that leak is detected as described above. For example, since each of the gratings 54A-H within the optical fiber 42 is tuned for (e.g., configured to reflect/filter) an individualized/different wavelength (or wavelengths) of the electromagnetic radiation, the processing system 48 may analyze the receiver data to determine which grating 54 was most likely affected to cause the wavelength shift(s) in the actual receiver data. Maintenance personnel may thereby inspect a certain area of the hatch-wall interface 30 and the associated portion of the seal element 32 to determine what repair or part (e.g., seal element) replacement is needed.

As described above, the method 700 may be performed for each of the sensor systems 40 such that each of the hatch-wall interfaces 30 is monitored for fluid leakage. Each of the processing systems 48 of FIG. 4 may be in signal communication (e.g., hardwired and/or wirelessly coupled) with a central processing system 58; e.g., a controller. This central processing system 58 may receive the notification signal(s) from the sensor system(s) 40, and then relay notification information to a pilot and/or other personnel. The central processing system 58 may also or alternatively store the notification information for consideration (e.g., review, analysis, etc.) by, for example, a ground maintenance crew. Of course, in other embodiments, some or all of the sensor systems 40 may share a single central processing system 58 where the processing systems 48 (see FIG. 5, 6) are integrated into the central processing system 58. In such embodiments, however, the gratings 54 in each sensor system 40 may be discretely tuned such that the wavelength shift(s) may identify which one of the hatch-wall interfaces 30 is associated with the fluid leakage.

The second electromagnetic radiation described above includes the wavelength(s) of electromagnetic radiation that pass through the various gratings 54 within the optical fiber 42. In such embodiments, referring to FIG. 5, the transmitter 44 may be located at the fiber first end 50 and the receiver 46 may be located at the fiber second end 52. Such an arrangement may be implemented for various installations including, but not limited to, those where a longitudinal length of the optical fiber 42 is relatively short and both fiber ends 50 and 52 are open. However, in other embodiments, the second electromagnetic radiation may include the electromagnetic radiation that is reflected by the gratings 54. In such embodiments, referring to FIG. 6, the transmitter 44 and the receiver 46 may both be located at a common fiber end 50, 52; e.g., the fiber first end 50. Such an arrangement may be implemented for various installations including, but not limited to, those where the longitudinal length of the optical fiber 42 is relatively long and one of the ends 50, 52 (e.g., the fiber second end 52) is closed; e.g., capped.

Figure 8:
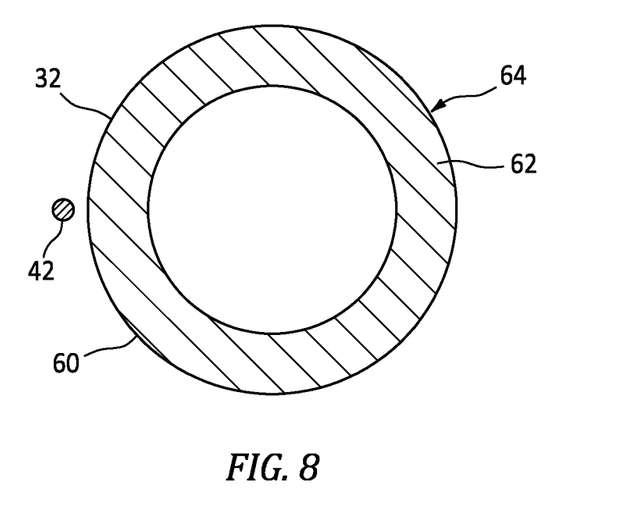
FIG. 8 is a cross-sectional illustration of a seal element and an optical fiber configured discrete from the seal element.

In some embodiments, referring to FIG. 8, at least a portion or an entirety of the optical fiber 42 may be disposed along and outside of the seal element 32 at the hatch-wall interface 30. The optical fiber 42, for example, may be located next to and may extend longitudinally along an exterior surface 60 of the seal element 32. The optical fiber 42 may engage (e.g., contact) the seal element 32. Alternatively, the optical fiber 42 may be (e.g., slightly) spaced from and disengaged with (e.g., not contacting) the seal element 32.

Figure 9:
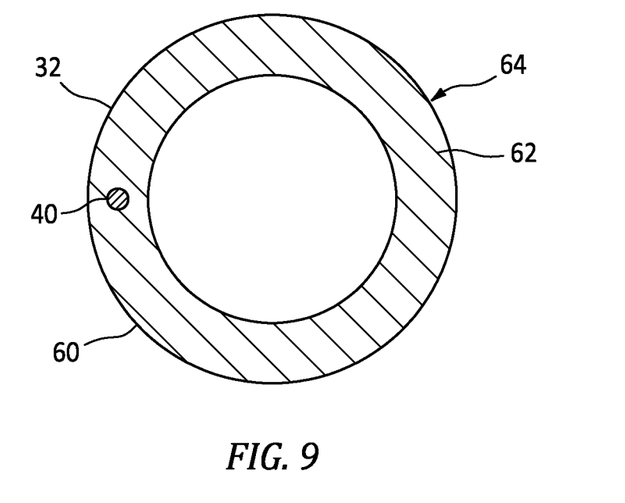
FIG. 9 is a cross-sectional illustration of the seal element and the optical fiber configured integral with the seal element.

In some embodiments, referring to FIG. 9, at least a portion or an entirety of the optical fiber 42 may be disposed along and within the seal element 32 at the hatch-wall interface 30. The optical fiber 42, for example, may be integrated into material 62 of/a body 64 of the seal element 32.

Figure 10:
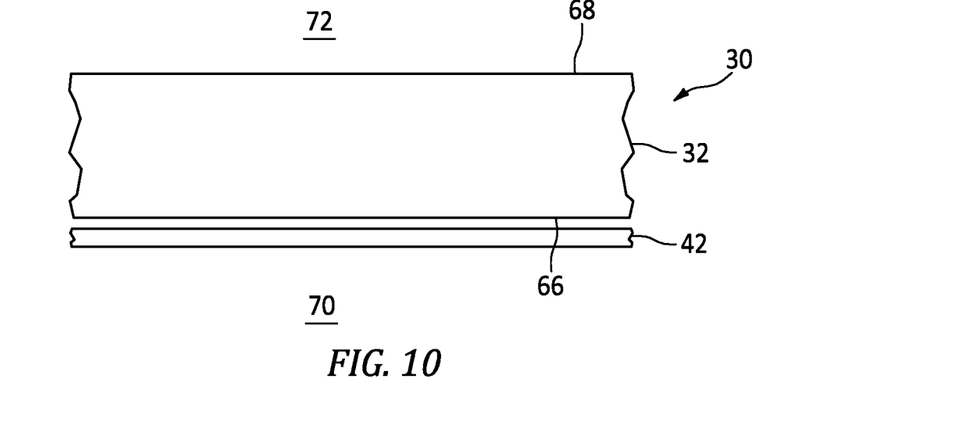
FIG. 10 is a partial illustration of the optical fiber arranged at an exterior side of the seal element.

In some embodiments, referring to FIG. 10, at least a portion or an entirety of the optical fiber 42 may be disposed at (e.g., on, towards, etc.) an exterior side 66 of the hatch-wall interface 30. The optical fiber 42, for example, may be located closer to the exterior side 66 of the hatch-wall interface 30 than an interior side 68 of the hatch-wall interface 30. The exterior side 66 of the hatch-wall interface 30 is next to or proximate an external environment 70 outside of the aircraft fuselage 22. The interior side 68 of the hatch-wall interface 30 is next to or proximate an internal environment 72 inside of the aircraft fuselage 22; e.g., the aircraft cabin.

Figure 11:
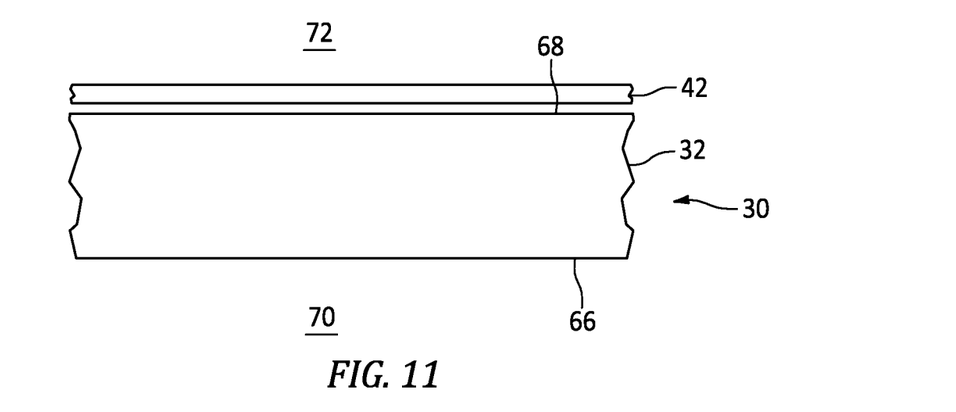
FIG. 11 is a partial illustration of the optical fiber arranged at an interior side of the seal element.

In some embodiments, referring to FIG. 11, at least a portion or an entirety of the optical fiber 42 may be disposed at (e.g., on, towards, etc.) the interior side 68 of the hatch-wall interface 30. The optical fiber 42, for example, may be located closer to the interior side 68 of the hatch-wall interface 30 than the exterior side 66 of the hatch-wall interface 30.

Figure 12:
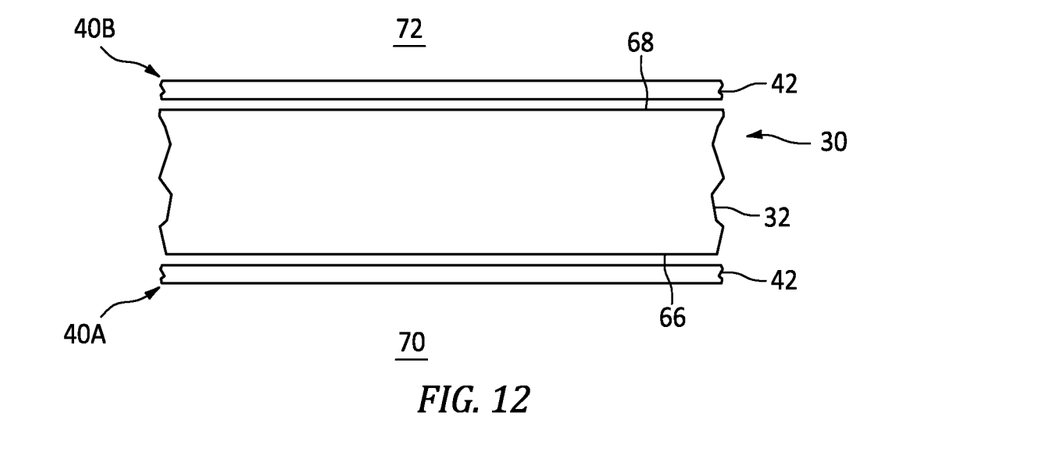
FIG. 12 is a partial illustration of optical fibers arranged on both sides of the seal element.

In some embodiments, referring to FIGS. 10 and 11, each hatch-wall interface 30 may be associated with a single sensor system 40. In other embodiments, referring to FIG. 12, one or more of the hatch-wall interfaces 30 may each be associated with a plurality of the sensor systems 40A and 40B. One of these sensor systems 40A may be disposed at the exterior side 66 of the hatch-wall interface 30, and the other one of the sensor systems 40 may be disposed at the interior side 68 of the hatch-wall interface 30. The multiple sensor systems 40 may thereby provide redundancy to reduce or eliminate provision of false positives.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft, comprising:
 a fuselage including a wall and a hatch configured to close an opening in the wall; and
 a sensor system including an optical fiber, a transmitter and a receiver, the optical fiber arranged at an interface between the hatch and the wall, the transmitter configured to transmit first electromagnetic radiation into the optical fiber, the receiver configured to detect second electromagnetic radiation received from the optical fiber to provide receiver data, and the sensor system configured to detect fluid leakage across the interface between the hatch and the wall based on the receiver data.

2. The assembly of claim 1, wherein the sensor system is further configured to
process the receiver data to determine a difference between the second electromagnetic radiation and expected electromagnetic radiation; and
detect the fluid leakage based on the difference between the second electromagnetic radiation and the expected electromagnetic radiation.

3. The assembly of claim 2, wherein the difference between the second electromagnetic radiation and the expected electromagnetic radiation comprises a wavelength shift between the second electromagnetic radiation and the expected electromagnetic radiation.

4. The assembly of claim 1, wherein the sensor system is further configured to determine a flowrate of the fluid leakage across the interface between the hatch and the wall based on the receiver data.

5. The assembly of claim 4, wherein the sensor system is further configured to provide an indicator signal when the flowrate of the fluid leakage across the interface is greater than a threshold.

6. The assembly of claim 1, wherein the sensor system is further configured to determine a location of the fluid leakage across the interface.

7. The assembly of claim 1, wherein the optical fiber comprises a grating configured to shift a wavelength of the first electromagnetic radiation.

8. The assembly of claim 7, wherein the first electromagnetic radiation interacts with and passes through the grating to at least partially provide the second electromagnetic radiation.

9. The assembly of claim 7, wherein the second electromagnetic radiation comprises a reflection of at least a portion of the first electromagnetic radiation by the grating.

10. The assembly of claim 1, wherein
the optical fiber comprises a plurality of gratings arranged at discrete locations along the interface between the hatch and the wall;
the plurality of gratings comprises a first grating and a second grating;
the first grating is configured to reflect a first wavelength of electromagnetic radiation; and
the second grating is configured to reflect a second wavelength of electromagnetic radiation.

11. The assembly of claim 1, wherein
the optical fiber comprises a plurality of gratings arranged at discrete locations along the interface between the hatch and the wall; and
each of the plurality of gratings is associated with unique electromagnetic radiation transmitted into the optical fiber.

12. The assembly of claim 1, wherein
the optical fiber extends longitudinally between a first end and a second end; and
the transmitter and the receiver are arranged at the first end.

13. The assembly of claim 1, wherein
the optical fiber extends longitudinally between a first end and a second end;
the transmitter is arranged at the first end; and
the receiver is arranged at the second end.

14. The assembly of claim 1, further comprising:
a seal element arranged at the interface between the hatch and the wall;
the optical fiber disposed along and outside of the seal element.

15. The assembly of claim 1, further comprising:
a seal element arranged at the interface between the hatch and the wall; and
at least a portion of the optical fiber disposed within the seal element.

16. The assembly of claim 1, wherein the optical fiber is disposed at an exterior side or an interior side of the interface between the hatch and the wall.

17. The assembly of claim 1, further comprising:
a second sensor system including a second optical fiber, a second transmitter and a second receiver;
the second optical fiber arranged at the interface between the hatch and the wall;
the second transmitter configured to transmit third electromagnetic radiation into the second optical fiber;
the second receiver configured to detect fourth electromagnetic radiation received from the second optical fiber to provide second receiver data; and
the second sensor system configured to detect fluid leakage across the interface between the hatch and the wall based on the second receiver data.

18. An assembly for an aircraft, comprising:
a fuselage including a wall and a hatch configured to close an opening in the wall; and
a sensor system including an optical fiber, a transmitter and a receiver, the optical fiber arranged at an interface between the hatch and the wall, the transmitter configured to transmit first electromagnetic radiation into the optical fiber, the receiver configured to detect second electromagnetic radiation received from the optical fiber to provide receiver data, the sensor system configured to determine temperature data at the interface between the hatch and the wall based on the receiver data, and the sensor system further configured to process the temperature data to detect fluid leakage across the interface between the hatch and the wall.

19. A method involving an aircraft fuselage including a wall and a hatch, the method comprising:
transmitting first electromagnetic radiation into an optical fiber, the optical fiber arranged at an interface between the hatch and the wall, and the hatch configured to close an opening in the wall;
detecting actual second electromagnetic radiation received from the optical fiber; and
detecting a fluid leak across the interface between the hatch and the wall based on a wavelength shift between the actual second electromagnetic radiation and expected second electromagnetic radiation.

\* \* \* \* \*